(12) United States Patent
Zhang

(10) Patent No.: US 9,567,076 B2
(45) Date of Patent: Feb. 14, 2017

(54) UNMANNED AERIAL VEHICLE AND FUSELAGE THEREOF AND METHOD FOR MANUFACTURING THE FUSELAGE

(71) Applicant: Shenzhen AEE Technology Co., Ltd, Shenzhen, Guangdong (CN)

(72) Inventor: Xianzhi Zhang, Shenzhen (CN)

(73) Assignee: SHENZHEN AEE TECHNOLOGY CO., LTD, Shenzhen (CN)

( * ) Notice: Subject to any disclaimer, the term of this patent is extended or adjusted under 35 U.S.C. 154(b) by 189 days.

(21) Appl. No.: 14/418,481

(22) PCT Filed: May 22, 2014

(86) PCT No.: PCT/CN2014/078176
§ 371 (c)(1),
(2) Date: Jan. 30, 2015

(87) PCT Pub. No.: WO2015/109700
PCT Pub. Date: Jul. 30, 2015

(65) Prior Publication Data
US 2015/0336670 A1    Nov. 26, 2015

(30) Foreign Application Priority Data

Jan. 24, 2014  (CN) .......................... 2014 1 0036901

(51) Int. Cl.
B64C 39/02 (2006.01)
B64C 1/00 (2006.01)
(Continued)

(52) U.S. Cl.
CPC ........... *B64C 39/024* (2013.01); *B29C 43/003* (2013.01); *B29C 43/18* (2013.01); *B64C 1/00* (2013.01);
(Continued)

(58) Field of Classification Search
CPC .... B64C 39/024; B64C 1/00; B64C 2201/024; B64C 2201/108; B29C 43/003; B29C 43/18; B29K 2021/003
See application file for complete search history.

(56) References Cited

U.S. PATENT DOCUMENTS 5,277,380 A * 1/1994 Cycon ..................... B64C 27/20 244/12.2
5,351,913 A * 10/1994 Cycon ..................... B64C 27/20 244/12.2

(Continued)

*Primary Examiner* — Valentina Xavier

(57) ABSTRACT

The present disclosure provides a fuselage of an unmanned aerial vehicle. The fuselage comprises an upper plate, a lower plate opposite to the upper plate, a connecting plate, and a middle spacing plate; the connecting plate is connected between the upper plate and the lower plate; the upper plate, the lower plate, and the connecting plate are enclosed to define a receiving space; the upper plate, the lower plate, the connecting plate, and the middle spacing plate are integrally formed; the upper cavity is located between the middle spacing plate and the upper plate, and the lower cavity is located between the middle spacing plate and the lower plate; and a first mounting opening is defined in the upper plate allowing a component to enter the upper cavity, and a second mounting opening is defined in the lower plate allowing a component to enter the lower cavity.

16 Claims, 11 Drawing Sheets

(51) Int. Cl.
  *B29C 43/00* (2006.01)
  *B29C 43/18* (2006.01)
  *B29K 21/00* (2006.01)

(52) U.S. Cl.
  CPC .... *B29K 2021/003* (2013.01); *B64C 2201/024* (2013.01); *B64C 2201/108* (2013.01)

(56) References Cited

U.S. PATENT DOCUMENTS

| | | | |
|---|---|---|---|
| 2013/0206915 A1* | 8/2013 | Desaulniers | B64C 39/024 244/165 |
| 2016/0194069 A1* | 7/2016 | Taylor | B64C 39/024 244/17.23 |

* cited by examiner

UNMANNED AERIAL VEHICLE AND FUSELAGE THEREOF AND METHOD FOR MANUFACTURING THE FUSELAGE

BACKGROUND

1. Technical Field

The present invention relates to aircrafts, and particularly, to an unmanned aerial vehicle, a fuselage thereof, and a method for manufacturing the fuselage.

2. Description of Related Art

At present, an unmanned aerial vehicle is capable of performing various kinds of reconnaissance and supervision tasks by mounting a visible light camera, a motion picture camera, a standard or low-light level television camera, an infrared scanner, and radar on a housing thereof, therefore, the unmanned aerial vehicle is applicable in fields including security, reconnaissance, and forest fire prevention. However, the unmanned aerial vehicle has following drawbacks: the housing generally includes a front housing and a rear housing which are secured together by a large number of screws, which greatly increases the weight of the unmanned aerial vehicle and affects the flying performance of the unmanned aerial vehicle; moreover, it is inconvenient to assemble and disassemble the housings, making the maintenance and replacement of the component inside the housing troublesome; in addition, signal shielding between two modules inside the housing is weak and interference is generally produced between the modules, which affects the quality of the signal transmission of each module and may even affects the flying safety of the unmanned aerial vehicle; furthermore, the arrangement of the modules inside the housing is unreasonable, preventing the space of the housing from being utilized reasonably.

SUMMARY

The main purpose of the invention is to provide a fuselage of an unmanned aerial vehicle to reduce a weight of the unmanned aerial vehicle as a whole and thus to improve the flying performance of the unmanned aerial vehicle and to facilitate the maintenance and replacement of a component of the unmanned aerial vehicle.

In order to achieve the above purpose, a fuselage of an unmanned aerial vehicle is provided. The fuselage includes an upper plate, a lower plate opposite to the upper plate, a connecting plate, and a middle spacing plate; the connecting plate is connected between the upper plate and the lower plate; the upper plate, the lower plate, and the connecting plate are enclosed to define a receiving space; the middle spacing plate is arranged in the receiving space and divides the receiving space into an upper cavity and a lower cavity; the upper plate, the lower plate, the connecting plate, and the middle spacing plate are integrally formed; the upper cavity is located between the middle spacing plate and the upper plate, and the lower cavity is located between the middle spacing plate and the lower plate; and a first mounting opening is defined in the upper plate allowing a component to enter the upper cavity, and a second mounting opening is defined in the lower plate allowing a component to enter the lower cavity.

The present disclosure further provides a method for manufacturing the aforementioned fuselage, including:

providing a first mold plate and a second mold plate, wherein the first mold plate has a first sub-mold surface facing the second mold plate, the first sub-mold surface is recessed to form a first mold plate cavity, and a first cylinder body is arranged in the first mold plate cavity; the second mold plate has a second sub-mold surface facing the first mold plate, the second sub-mold surface is recessed to form a second mold plate cavity, and a second cylinder body is arranged in the second mold plate cavity;

forming the upper plate of the fuselage and an upper portion of the connecting plate through the first mold plate cavity, and forming the lower plate of the fuselage and a lower portion of the connecting plate through the second mold plate cavity;

filling the first mold plate cavity in which the upper plate and the upper portion are formed with a first filler till a height of the first filler reaches that of the first cylinder body, and filling the second mold plate cavity in which the lower plate and the lower portion are formed with a second filler till a height of the second filler reaches that of the second cylinder body;

providing the middle spacing plate, arranging the middle spacing plate in the first mold plate cavity or the second mold plate cavity, and coating glue on connecting positions between the middle spacing plate, the lower portion, and the upper portion;

closing the first mold plate and the second mold plate for a preset time duration such that the upper portion, the lower portion, and the middle spacing plate are integrated into one piece; and separating the first mold plate from the second mold plate, and taking the filler out through the first mounting opening in the upper plate and the second mounting opening in the lower plate, thereby obtaining the fuselage.

The present disclosure further yet provides an unmanned aerial vehicle including a housing and a remote sensing equipment arranged in the housing; the housing includes an upper cover, a lower cover, and the aforementioned fuselage; the upper cover is detachably mounted on the upper plate of the fuselage to cover the first mounting opening; and the lower cover is detachably mounted on the lower plate of the fuselage to cover the second mounting opening.

Compared with the existing unmanned aerial vehicle of which the front housing and the rear housing are locked together to form the housing by a large number of screws, the number of screws used in the unmanned aerial vehicle of the present disclosure is greatly reduced to effectively reduce the whole weight of the unmanned aerial vehicle, thereby improving the flying performance of the unmanned aerial vehicle; further, components of the unmanned aerial vehicle can be mounted on both sides of the middle spacing plate, allowing for better utilization of the inner space of the housing and avoiding interference between components; in addition, when maintenance or replacement of the component of the unmanned aerial vehicle is required, the upper cover or the lower cover is opened, the corresponding component is taken out through the first mounting opening or the second mounting opening, and the repaired or replaced component is arranged into the inner space of the fuselage without dividing the housing into two parts, which greatly saves time for mounting and dissembling the large number of screws and thus facilitates the mounting and replacement of the components.

The realization of the object, features, and advantages of the present disclosure are given in further detail in combination with the embodiments with reference to the accompanying drawings.

DETAILED DESCRIPTION

It should be understood that the embodiments described herein are only used to explain the present disclosure rather than to limit the present disclosure.

As shown in FIGS. 1 to 13, an unmanned aerial vehicle in accordance with an embodiment is provided. The unmanned aerial vehicle includes a housing 1 and a remote sensing equipment including but not limited to a camera device, an infrared scanner, and/or radar. The housing 1 includes an upper cover 10, a lower cover 12, and a fuselage 14.

Figure 5:
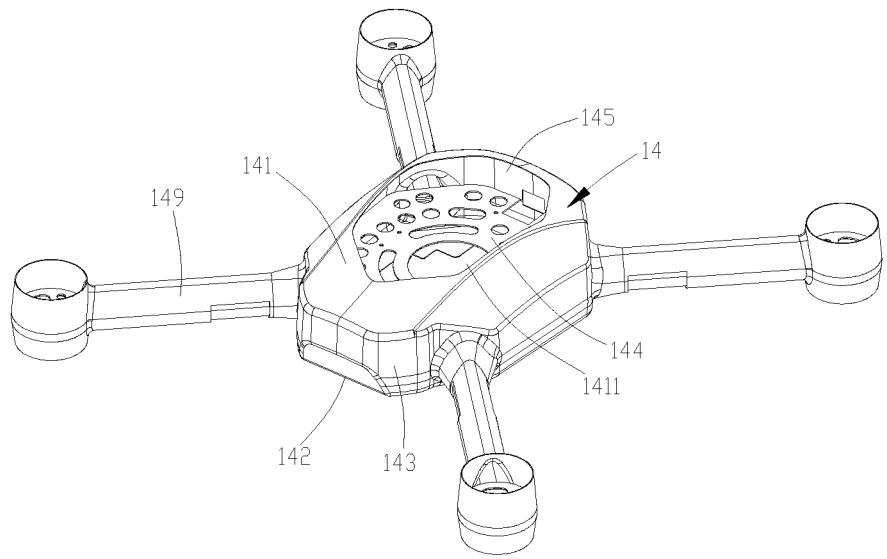
FIG. 5 is an assembly view of a fuselage and an arm of the unmanned aerial vehicle of FIG. 1.
Figure 6:
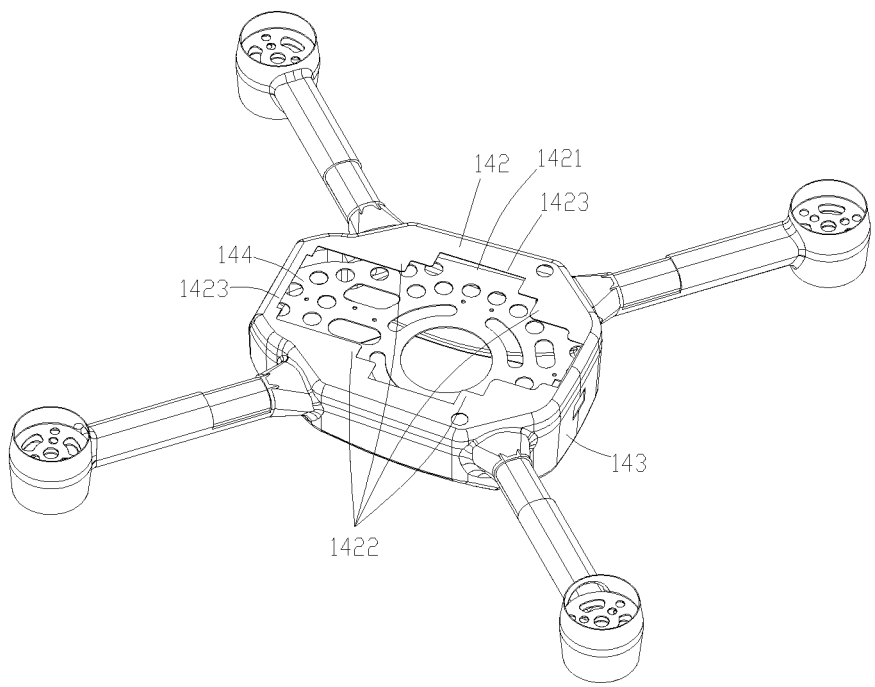
FIG. 6 is similar to FIG. 5, but viewed from another angle.
Figure 10:
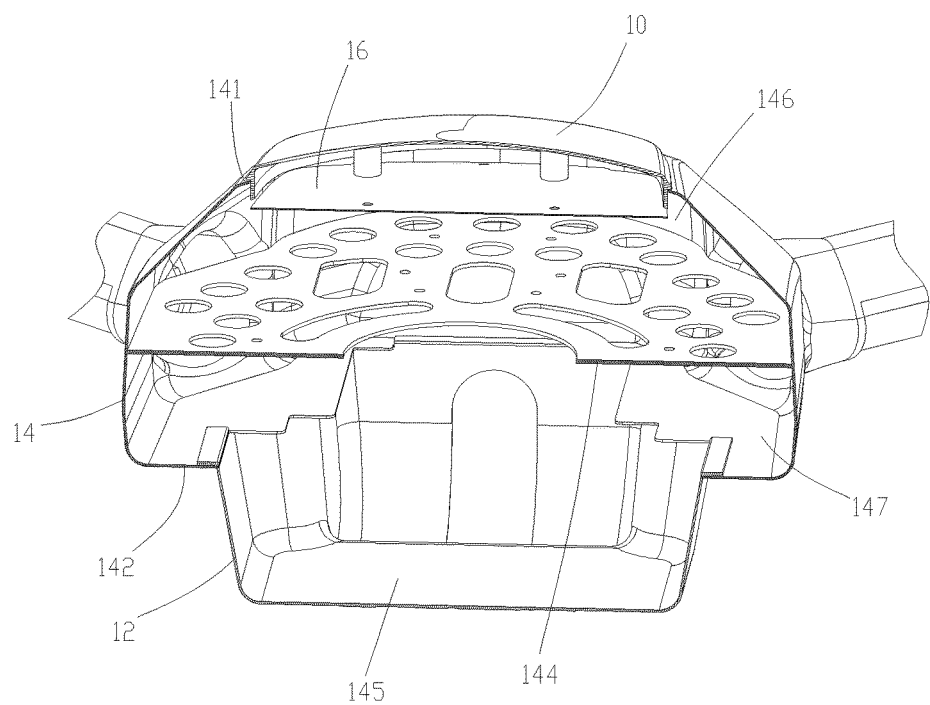
FIG. 10 is a cross-sectional view of the unmanned aerial vehicle of FIG. 1 with the fuselage, the arm, the shielding plate, the upper cover, and the lower cover thereof being assembled together.

Referring to FIGS. 5, 6, and 10, the fuselage 14 includes an upper plate 141, a lower plate 142 opposite to the upper plate 141, a connecting plate 143, and a middle spacing plate 144. The connecting plate 143 is connected between the upper plate 141 and the lower plate 142. The upper plate 141, the lower plate 142, and the connecting plate 143 are enclosed to form a receiving space 145 (as shown in FIG. 5). The middle spacing plate 144 is received in the receiving space 145 and divides the receiving space 145 into an upper cavity 146 and a lower cavity 147 (as shown in FIG. 10). The upper plate 141, the lower plate 142, the connecting plate 143, and the middle spacing plate 144 are integrally formed. The upper cavity 146 is located between the middle spacing plate 144 and the upper plate 141, and the lower cavity 147 is located between the middle spacing plate 144 and the lower plate 142. A first mounting opening 1411 (as shown in FIG. 5) is formed in the upper plate 141 allowing a component to be arranged into the upper cavity 146, and a second mounting opening 1421 (as shown in FIG. 6) is formed in the lower plate 142 allowing a component to be arranged into the lower cavity 147.

Figure 1:
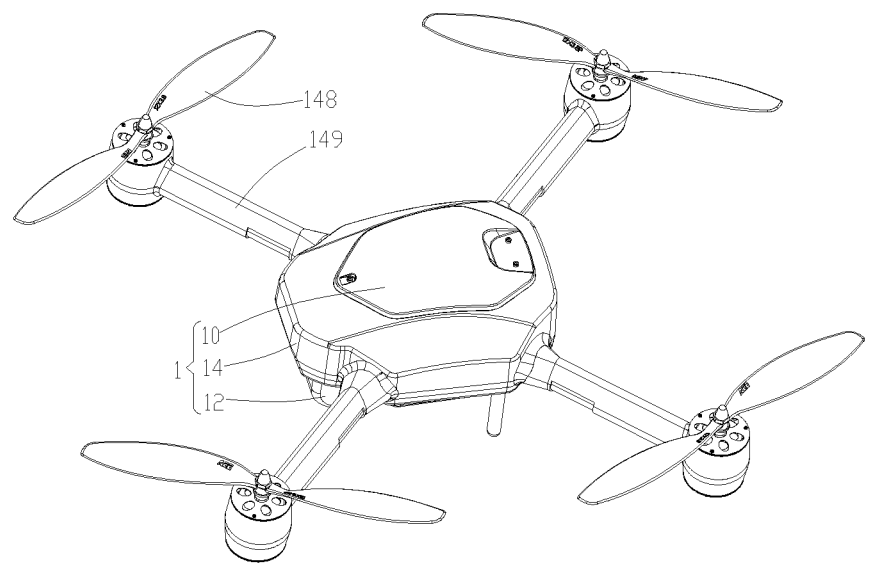
FIG. 1 is an assembly view of an unmanned aerial vehicle in accordance with an embodiment of the present disclosure.
Figure 2:
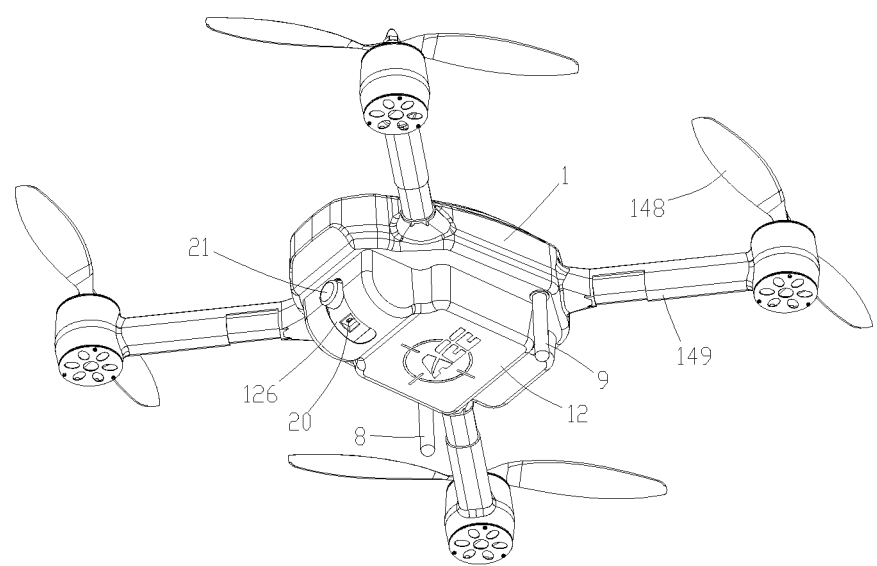
FIG. 2 is similar to FIG. 1, but viewed from another angle.

Referring also to FIGS. 1 and 2, the upper cover 10 is detachably mounted on the upper plate 141 of the fuselage 14 of the unmanned aerial vehicle to cover the first mounting opening 1411, and the lower cover 12 is detachably mounted on the lower plate 142 of the fuselage 14 to cover the second mounting opening 1421.

In the unmanned aerial vehicle, the housing 1 includes the upper cover 10, the lower cover 12, and the fuselage 14; the upper plate 141, the lower plate 142, the connecting plate 143, and the middle spacing plate 144 of the fuselage 14 are integrally formed; the integrally-formed fuselage 14 provides a main receiving space for arranging components of the unmanned aerial vehicle; the upper plate 141 and the lower plate 142 respectively form the first mounting opening 1411 allowing a component to be arranged into the upper cavity 146 and the second mounting opening 1421 allowing a component to be arranged into the lower cavity 147; and the upper cover 10 and the lower cover 12 are detachably mounted on the upper plate 141 and the lower plate 142 of the fuselage 14 by dampers or screws, respectively. Compared with the existing unmanned aerial vehicle of which the front housing and the rear housing are locked together to form the housing by a large number of screws, the number of screws used in the unmanned aerial vehicle of the present disclosure is greatly reduced to effectively reduce the whole weight of the unmanned aerial vehicle, thereby improving the flying performance of the unmanned aerial vehicle; further, components of the unmanned aerial vehicle can be mounted on both sides of the middle spacing plate 144, allowing for better utilization of the inner space of the housing 1 and avoiding interference between components; in addition, when maintenance or replacement of the component of the unmanned aerial vehicle is required, the upper cover 10 or the lower cover 12 is opened, the corresponding component is taken out through the first mounting opening 1411 or the second mounting opening 1421, and the repaired or replaced component is arranged into the inner space of the fuselage 14 without dividing the housing into two parts, which greatly saves time for mounting and dissembling the large number of screws and thus facilitates the mounting and replacement of the components.

The upper plate 141, the lower plate 142, the connecting plate 143, and the middle spacing plate 144 are preferably integrally formed by conductive material such as carbon fiber; in this way, the middle spacing plate 144 not only can be used to secure components of the unmanned aerial vehicle, but also to shield and separate signals generated by components secured on both sides thereof to avoid interference between the signals. Therefore, the flying safety of the unmanned aerial vehicle is improved. Due to properties including light weight, good intensity, good tenacity, and conductivity, the fuselage 14 made of carbon fiber is light in weight and at the same time is capable of providing sufficient supporting strength for components mounted inside the fuselage 14.

The upper cover 10 and the lower cover 12 are preferably made of material with light weight, good strength, good tenacity and signal transmissibility such as glass fiber, allowing signals generated inside the housing 1 can be transmitted out through the upper cover 10 and the lower cover 12.

Referring to FIGS. 1 and 2, a number of arms 149 are connected on an outer side of the connecting plate 143 of the fuselage 14 for mounting propellers 148. The arm 149 can be integrally formed with the connecting plate 143 of the fuselage 14. Optionally, the arm 149 and the fuselage 14 can be separately mounted and then secured together. In the embodiment, the arms 149 are independently formed from the fuselage 14.

The receiving space 145 is divided into the upper cavity 146 and the lower cavity 147 by the middle spacing plate 144. The upper cavity 146 can be used to arrange components which do not need to be taken out frequently, and the lower cavity 147 can be used to arrange components which need to be taken out frequently. By separately arranging components which do not need to be taken out frequently and component which need to be taken out frequently, damage of other components caused when a component is being taken out can be avoided.

In the embodiment, the lower cover 12 can be clamped onto the lower plate 142 of the fuselage 14, therefore, components can be taken out conveniently. The upper cover 10 can be locked onto the upper plate 141 via screws. In other embodiments, the upper cover 10 can also be clamped onto the upper plate 141.

Figure 8:
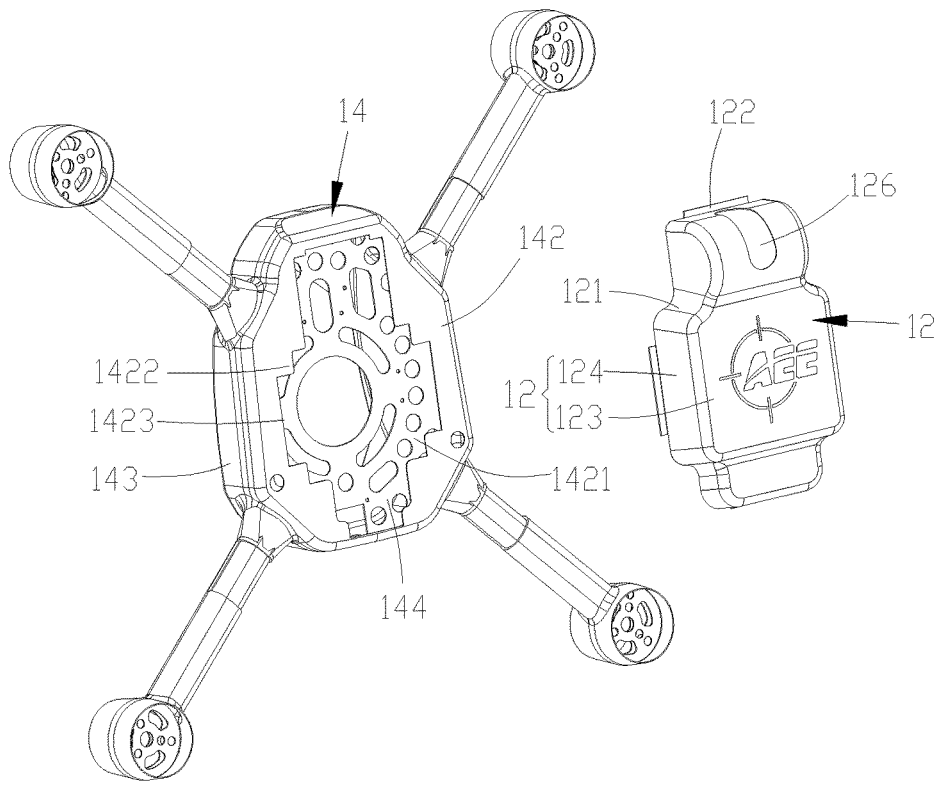
FIG. 8 is a schematic view showing the fuselage is separated from a lower cover of the unmanned aerial vehicle of FIG. 2.
Figure 9:
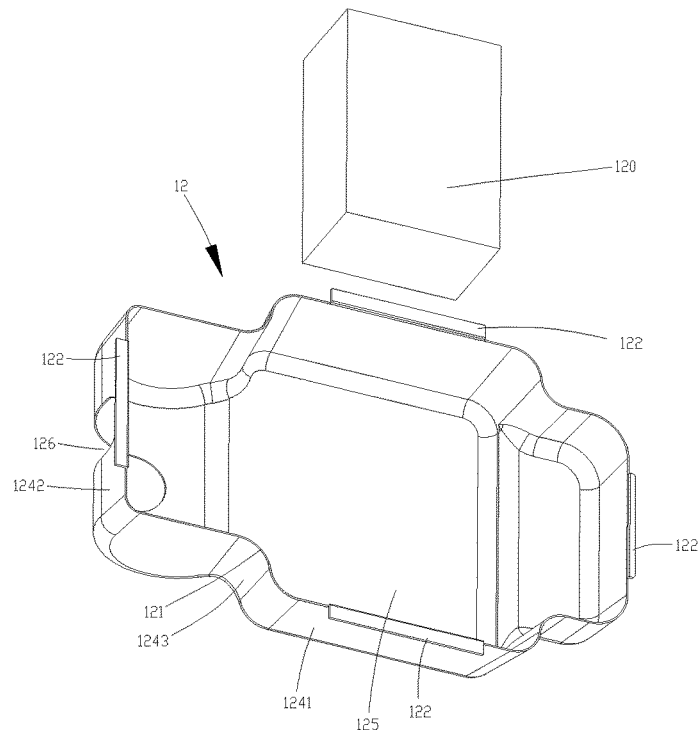
FIG. 9 is a schematic view of the lower cover and a battery shown in FIG. 8.

Referring together to FIGS. 6, 8, and 9, the lower plate 142 of the fuselage 14 is provided with a first restricting portion 1422 and a third restricting portion 1423, and the lower cover 12 is provided with a second restricting portion 121 and a fourth restricting portion 122. Motions in six directions between the lower cover 12 and the lower plate 142 of the fuselage 14 are restricted by abutting the first restricting portion 1422 against the second restricting portion 121 and by clamping the third restricting portion 1423 onto the fourth restricting portion 122.

In the embodiment, the lower cover 12 includes a bottom plate 123 and a side wall extending towards the lower plate 142 of the fuselage 14 from an edge of the bottom plate 123. The bottom plate 123 and the side wall 124 are enclosed to form a receiving cavity 125.

The unmanned aerial vehicle further includes a battery 120 mounted in the receiving cavity 125. Since the lower cover 12 is detachably mounted onto the lower plate 142 by being clamped onto the lower plate 142, the lower cover 12 can be disassembled from the lower plate 142 without using any special tool, allowing the battery 120 to be taken out quickly for replacement.

In detail, in the lower cover 12, the bottom plate 123 is cross shaped as a whole. The side wall 124 includes a couple of opposite first side plates 1241, a couple of opposite second side plates 1242, and a number of combination plates 1243 each of which is connected between a corresponding first side plate 1241 and the adjacent second side plate 1242.

The second restricting portion 121 is located on an end portion of the corresponding combination plate 1243 facing the lower plate 142. The first restricting portion 1422 includes a number of protruding edges protruding from a position of the lower plate 142 corresponding to the combination plate 1243 towards the second mounting opening 1421. The end portion of the combination plate 1243 facing the lower plate 142 abuts outer sides of the protruding edges. The fourth restricting portion 122 includes a number of blocks extending away from the receiving cavity 125 from one ends of the first side plate 1241 and the second side plate 1242 which are adjacent to the receiving cavity 125. The third restricting portion 1423 is located on the lower plate 142 and is adjacent to an edge of the second mounting opening 1421. The blocks are inserted into the lower cavity 147 by pressing the first side plate 1241 and the second side plate 1242. The blocks abut an inner side of the lower plate 142 adjacent to the edge of the second mounting hole 1421 after the first side plate 1241 and the second side plate 1242 are restored to their original positions, thereby clamping the lower cover 12 onto the lower plate 142.

The shape of the lower cover 12, the shapes and positions of the second restricting portion 121 and the fourth restricting portion 122 on the lower cover 12, and the shapes and positions of the first restricting portion 1422 and the fourth restricting portion 122 on the lower plate 142 are not limited herein. In other embodiments, appropriate modifications can be performed by one having ordinary skill in the art without departing from the scope of the embodiment to realize the clamping connection between the lower cover 12 and the lower plate 142, which would fall within the scope and spirit of the inventions. For example, in other embodiments, the fourth restricting portion 122 can only include blocks extending away from the receiving cavity 125 from one end of the first side plate 1241 or the second side plate 1242 adjacent to the lower plate 142. Also, the bottom plate 123 can be polygonal, the side wall 124 can include a number of side plates arranged as a polygon, and the fourth restricting portion 122 can include blocks extending away from the receiving cavity 125 from one ends of at least a part of the side plates or all the side plates.

Figure 7:
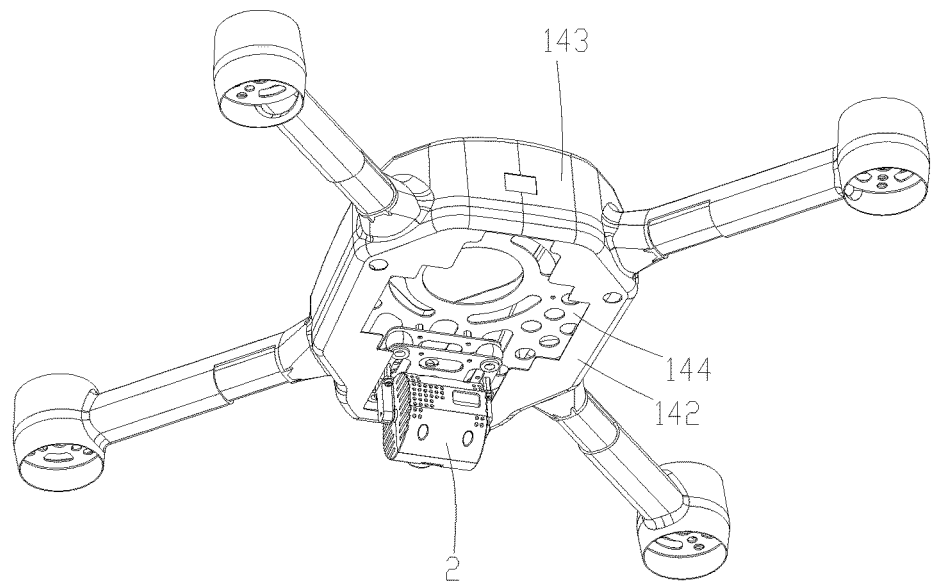
FIG. 7 is an assembly view of the fuselage, the arm, and a camera device of the unmanned aerial vehicle of FIG. 2.

Referring to FIGS. 2 and 7, in the embodiment, the remote sensing equipment includes a photographing device 2 which is detachably mounted on the middle spacing plate 144 by extending into the lower cavity 147 through the second mounting opening 1421. The photographing device 2 includes a lens set 21. The lower cover 12 defines an opening 126 allowing the lens set 21 to extend out of the lower cover 12. Mounting the photographing device 2 inside the housing 1 not only can maintain the streamline outlook of the unmanned aerial vehicle to reduce flying resistance, but also can realize covert photographing.

Figure 11:
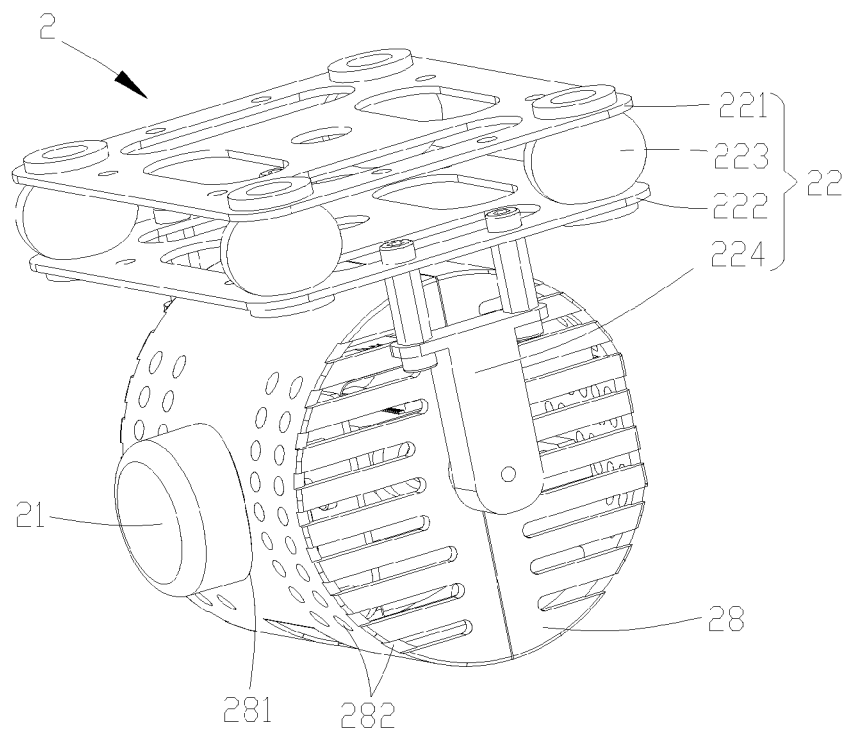
FIG. 11 is an assembly view of the camera device of the unmanned vehicle aerial of FIG. 2.
Figure 12:
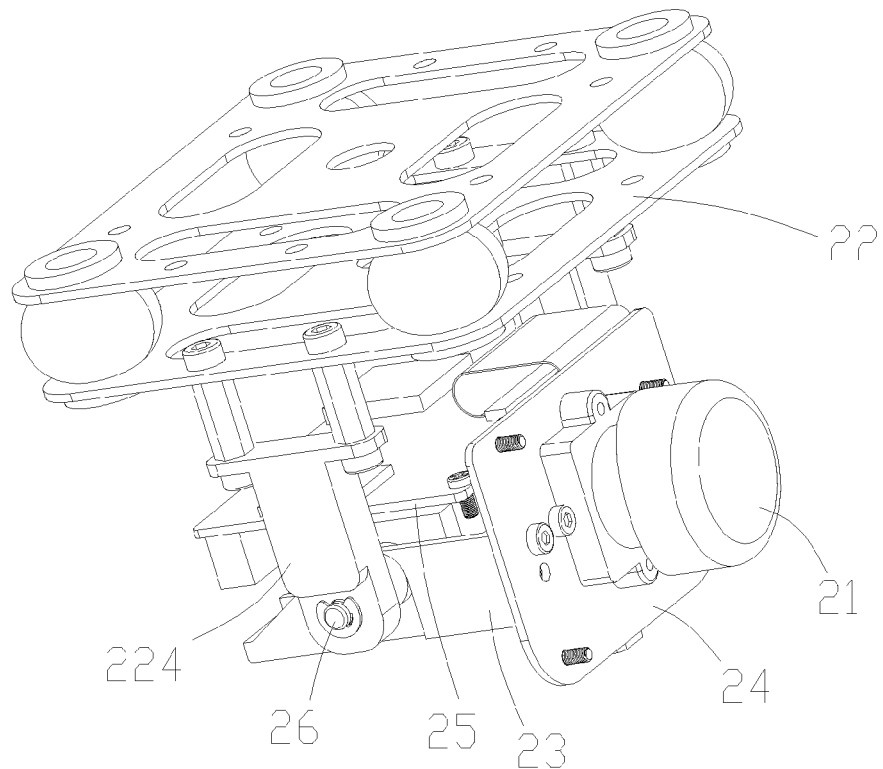
FIG. 12 is a schematic view of the camera device of FIG. 11 without a protection housing.
Figure 13:
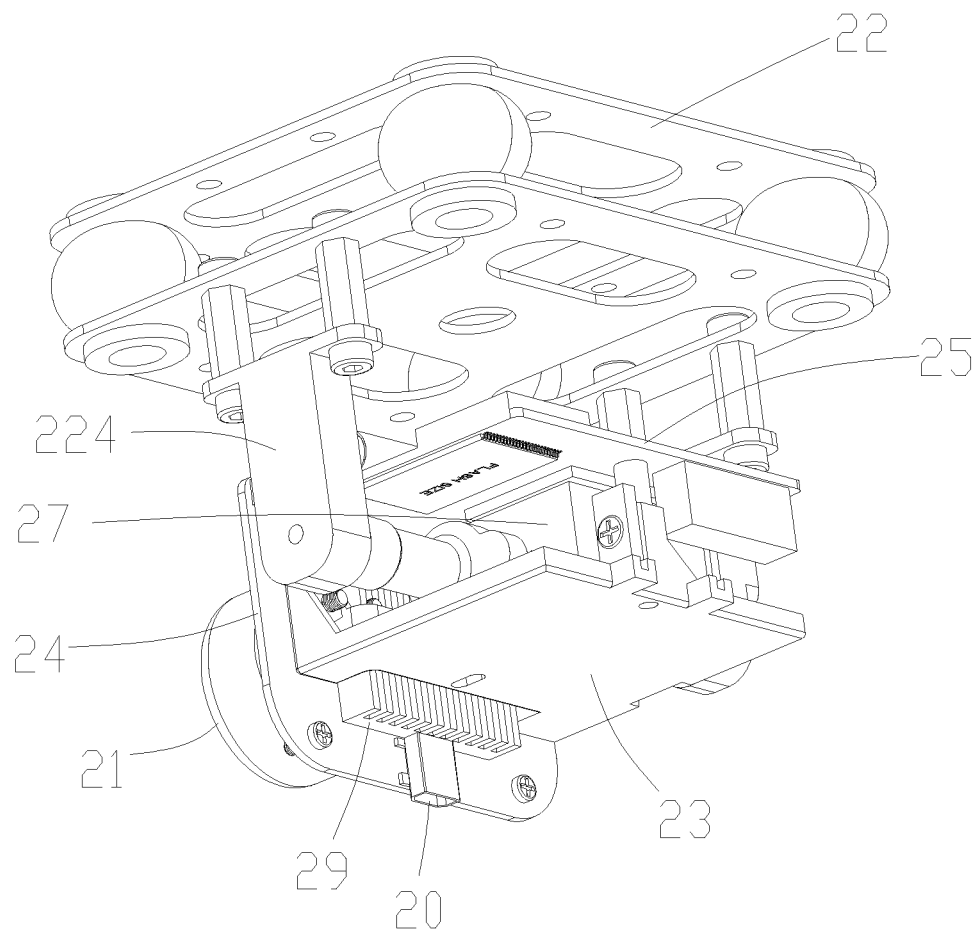
FIG. 13 is similar to FIG. 12, but viewed from another angle.

Referring also to FIGS. 11 to 13, in the embodiment, the photographing device 2 further includes a mounting bracket 22, a rotating bracket 23, a first PCB board 24 with an image obtaining chip fixed thereon, a second PCB board 25 with a main control chip and a storage module fixed thereon, and a driving device 27. The photographing device 2 is detachably mounted on the middle spacing plate 144 via the mounting bracket 22. The rotating bracket 23 is rotatably mounted on the mounting bracket 22 via a rotating shaft 26. The driving device 27 is connected to the rotating shaft 26 to drive the rotating shaft 26 to rotate, thereby driving the rotating bracket 23 to rotate relative to the mounting bracket 22. The first PCB board 24 and the second PCB board 25 are mounted on the rotating bracket 23, and the lens set is mounted on the first PCB board 24. The opening 126 is elongated such that the lens set 21 can rotate along the opening 125 to realize photographing in different directions. Combining with the control of the gesture of the unmanned aerial vehicle, the photographing device 2 can realize a full range of photographing.

By arranging the photographing device 2 in the lower cavity 147 and detachably mounting the photographing device 2 on the middle spacing plate 144, on one hand, different photographing devices 2 can be arranged according to different requirements without changing the inner structure of the fuselage 14, thereby meeting different user requirements; on the other hand, the detection and the maintenance of the photographing device 2 are facilitated and modularization design is realized.

The driving device 27 can include a driving motor and a deceleration device for reducing a rotation speed of the driving motor to a target speed. The deceleration device can include a number of meshed gears. The driving device 27 can be other known devices which are capable of driving the rotating shaft to rotate.

In other embodiments, the lens set 21 can be mounted on the first PCB board 24 in other ways. In this way, the driving device 27 for driving the lens set 21 can be omitted to save the mounting space of the housing 1 and to reduce the weight of the unmanned aerial vehicle.

Further, the photographing device 2 further includes a protection housing 28. The lens set 21, the rotating bracket 23, the driving device 27, the first PCB board 4, the second PCB board 25, and the rotating shaft 26 are arranged in the protection housing 28. The protection housing 28 defines a lens mounting hole 281 allowing the lens set 21 to extend out of the protection housing 18 and a number of vents 282. Two ends of the rotating shaft 26 extend out of the protection housing 28 and are rotatably mounted on the mounting bracket 22. With the protection housing 28, damage of the photographing device 2 caused by impacts from outer objects during the assembly and disassembly of the photographing device 2 can be avoided.

In detail, in the embodiment, the protection housing 28 is a hollow cylinder, including a circumferential surface and two opposite bottom surfaces. The lens mounting hole 281 is defined in the circumferential surface of the protection housing 28, and two ends of the rotating shaft 27 extends out of the protection housing 28 through the bottom surfaces.

The first PCB board 24 and the second PCB board 25 are perpendicularly arranged on the rotating bracket 23, thus, space can be reasonably utilized and interference between the two boards can be reduced. Particularly, the impact on the main control chip on the second PCB board 25 caused by the heat generated by the image obtaining chip on the first PCB board 24 can be reduced.

Furthermore, the photographing device 2 further includes a heat sink 29 which is mounted on one side of the first PCB board 24 away from the lens set 21 to cool electrical components on the first PCB board 24. The first PCB board 24 is further provided with an external port 20 to transmit data. When the lens set 21 rotates to a predefined-angle position, the external port 20 faces the opening 126 (as shown in FIG. 2) to facilitate the connection with external outer data lines.

The mounting bracket 22 includes a first fixing plate 221, a second fixing plate 222 spaced from the first fixing plate 221, a number of buffering members 223 connected between the first fixing plate 221 and the second fixing plate 222, and two supporting arms 224. The supporting arms 224 are secured on one side of the second fixing plate 222 away from the first fixing plate 221 for mounting the rotating bracket 23. The first fixing plate 221 and the middle spacing plate 144 are fixed together.

Figure 3:
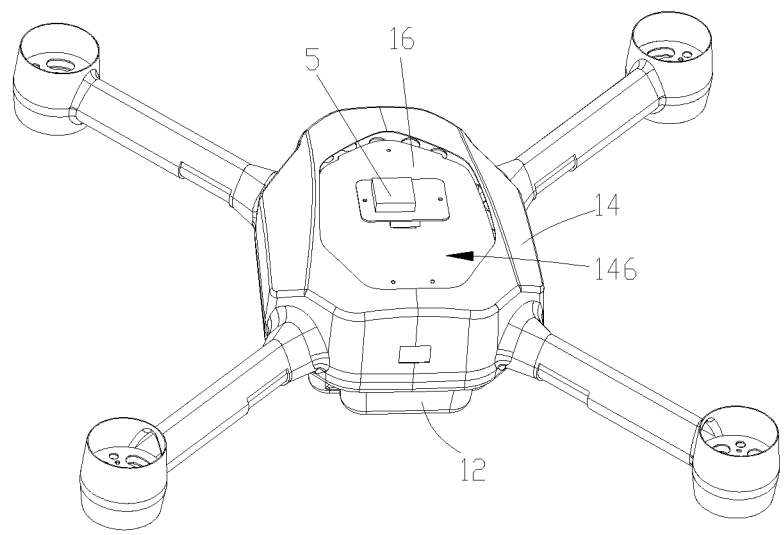
FIG. 3 is a schematic view of the unmanned aerial vehicle of FIG. 1 without an upper cover and propellers.
Figure 4:
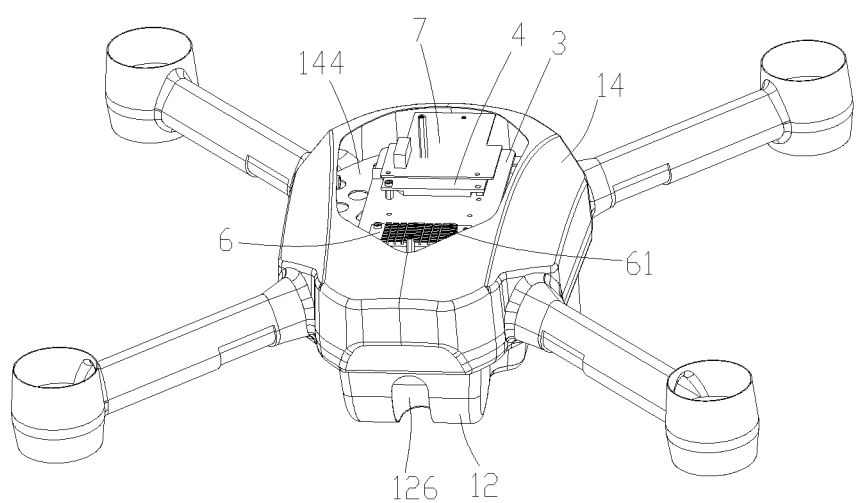
FIG. 4 is a schematic view of the unmanned aerial vehicle of FIG. 3 without a shielding plate and a GPS module.

Referring to FIGS. 3 and 4, in the embodiment, the unmanned aerial vehicle further includes a main control panel 3, a radio station panel 4, a GPS (Global Positioning System) module 5, a 2.4G image transmission panel 6, and a 3G (the third generation of mobile telecommunication technology) wireless module 7. The main control panel 3, the radio station panel 4, the GPS module 5, the 2.4 image transmission panel 6, and the 3G wireless module 7 are arranged in the upper cavity 146.

The housing 1 further includes a shielding plate 16 arranged in the upper cavity 146, spaced from the middle spacing plate 144. The main control panel 3, the radio station panel 4, the 2.4G image transmission panel 6, and the 3G wireless module 7 are located between the middle spacing plate 144 and the shielding plate 16. The GPS module 5 is located between the shielding plate 16 and the upper cover 10 such that the GPS module 5 can be prevented from being affected by the main control panel 3, the radio station panel 4, the 2.4G image transmission panel 6, and the 3G wireless module 7. Therefore, accurate positioning of the unmanned aerial vehicle can be realized. Correspondingly, signals generated by electrical components located between the middle spacing plate 144 and the shielding plate 16 can be transmitted through antennas which are arranged to extend out of the housing 1, or can be transmitted through the lower cover by defining through holes at corresponding positions of the middle spacing panel 144.

The 2.4G image transmission panel 6 is provided with a radiating plate 61 for radiating heat generated by heating electrical components on the 2.4G image transmission panel 6.

Figure 14:
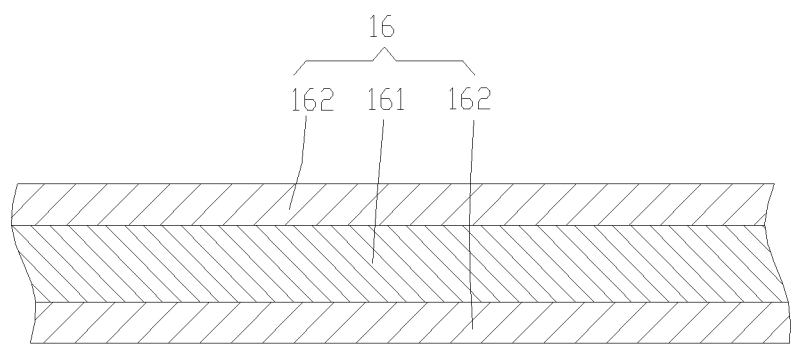
FIG. 14 is a partially cross-sectional view of the shielding plate of the unmanned aerial vehicle of FIG. 3.
Figure 15:
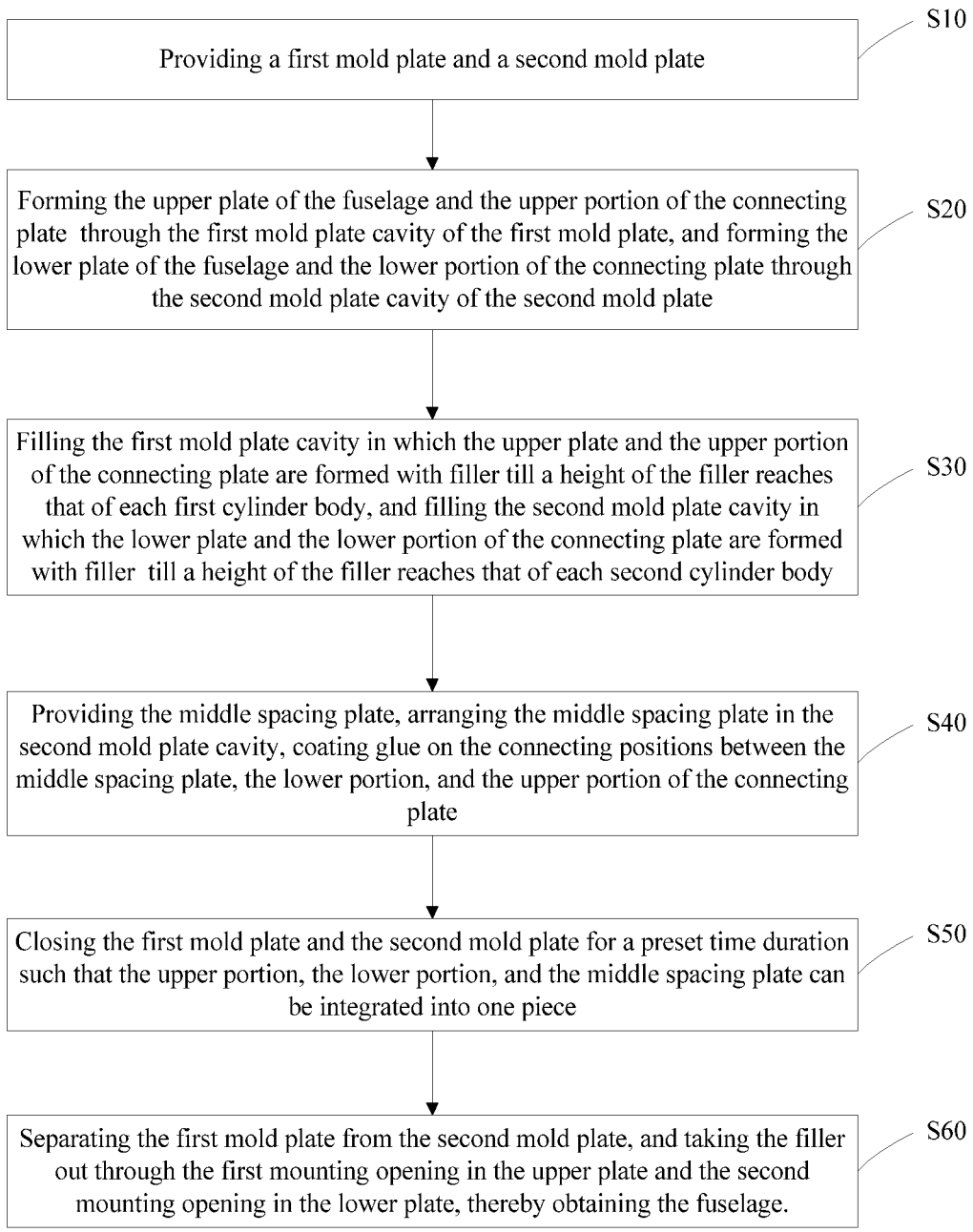
FIG. 15 is a flow chart of a method for manufacturing a fuselage of an unmanned aerial vehicle in accordance with an embodiment of the present disclosure.

Referring to FIG. 14, in the embodiment, the shielding plate 16 includes a middle conductive layer 161 and two insulating layers 162 respectively covering an upper surface and a lower surface of the middle conductive layer 161. The middle conductive layer 161 is capable of shielding signals, and the two insulating layers 162 are capable of avoiding short circuit caused by the contact between the middle conductive layer 161 and electrical components in the upper cavity 146. In general, the shielding plate 16 is greater than an area of the first mounting opening 1411 in the upper plate 141. In order to facilitate the mounting of the middle conductive layer 16 on the upper cavity 146 and enable the shielding plate to have sufficient supporting strength, the middle conductive layer 161 can be a copper sheet having a thickness ranging from 3 mm to 8 mm.

Referring to FIG. 2, furthermore, the unmanned aerial vehicle further includes a video transmission antenna 8 connected to the 2.4G image transmission panel 6 and a radio station antenna 9 connected to the radio station panel 4. The video transmission antenna 8 and the radio station antenna 9 extend out of the fuselage 14 through the lower plate 142 to be located at two sides of the lower cover. In this way, the outlook of the fuselage 14 can be ensured, and the signal interference between the two antennas is reduced.

As shown in FIGS. 15 to 20, a method for manufacturing the aforementioned fuselage 14 in accordance with an embodiment is provided. The method includes steps as follows.

Figure 16:
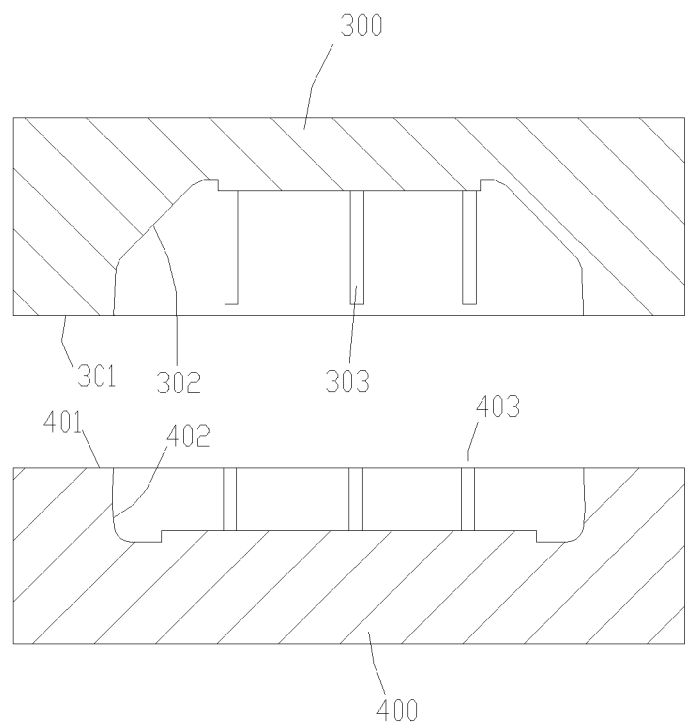
FIG. 16 is a schematic view of a first mold plate and a second mold plate used in the method of FIG. 15.

Step S10, providing a first mold plate 300 and a second mold plate 400. The first mold plate 300 has a first sub-mold surface 301 facing the second mold plate 400. The first sub-mold surface 301 is recessed to form a first mold plate cavity 302 and a number of first cylinder bodies 303 are arranged in the first mold plate cavity 302. The second mold plate 400 has a second sub-mold surface 401 facing the first mold plate 300. The second sub-mold surface 401 is recessed to form a second mold plate cavity 402 and a number of second cylinder bodies 403 are arranged in the second mold plate cavity 402 (as shown in FIG. 16).

Figure 17:
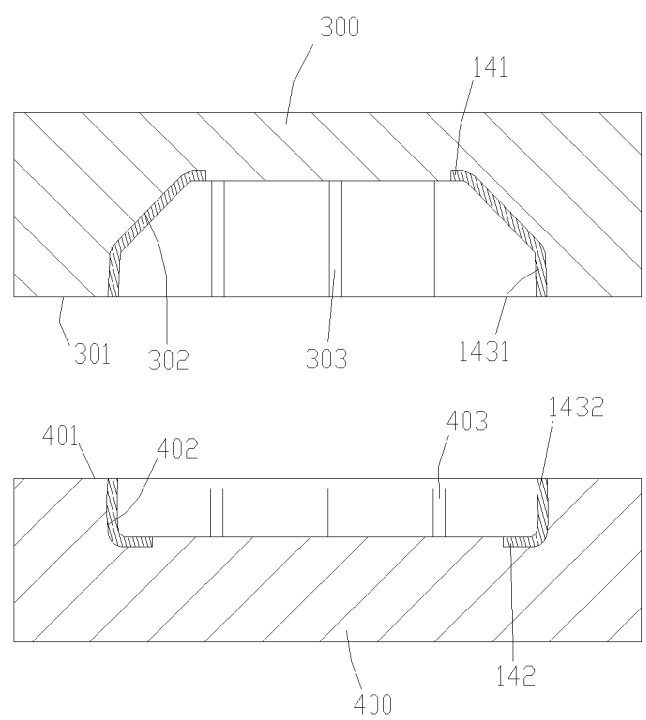
FIG. 17 is a schematic view corresponding to the following step of the method of FIG. 15: forming an upper plate of a fuselage and an upper portion of a connecting plate through the first mold plate, and forming a lower plate and a lower portion of the connecting plate through the second mold plate.
Figure 18:
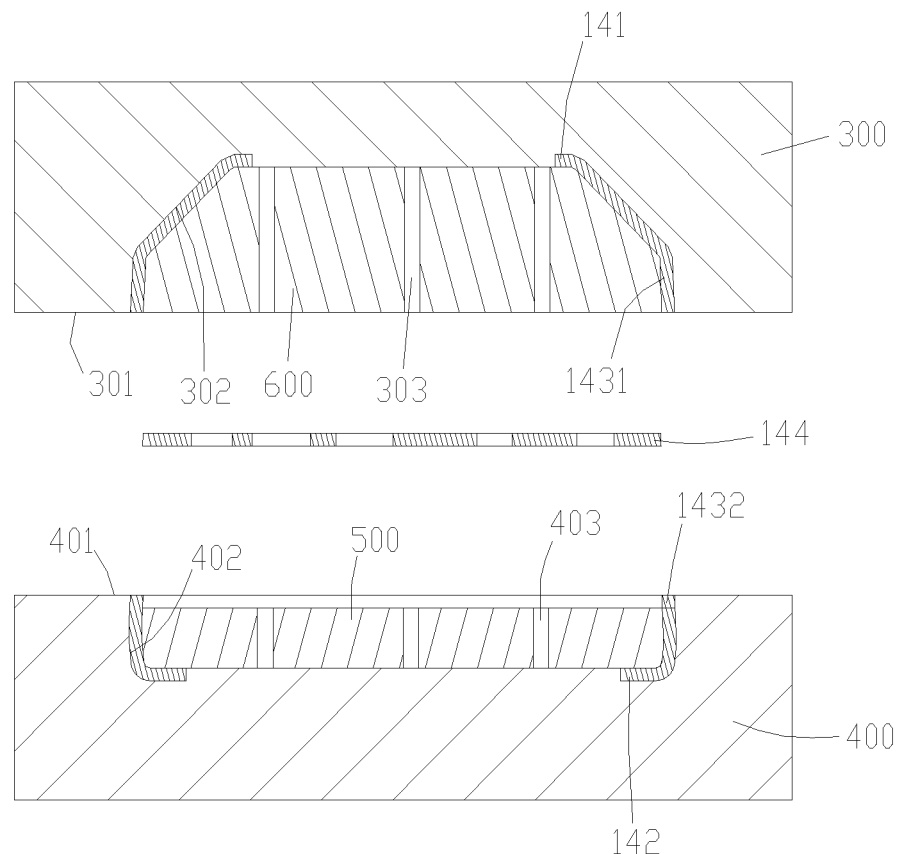
FIG. 18 is a schematic view corresponding to the following step of the method of FIG. 15 together with a middle spacing plate: filling a first mold plate cavity in which the upper plate and the upper portion are formed with filler till a height of the filler reaches that of each first cylinder body, and filling a second mold plate cavity in which the lower plate and the lower portion are formed with filler till a height of the filler reaches that of each second cylinder body.
Figure 19:
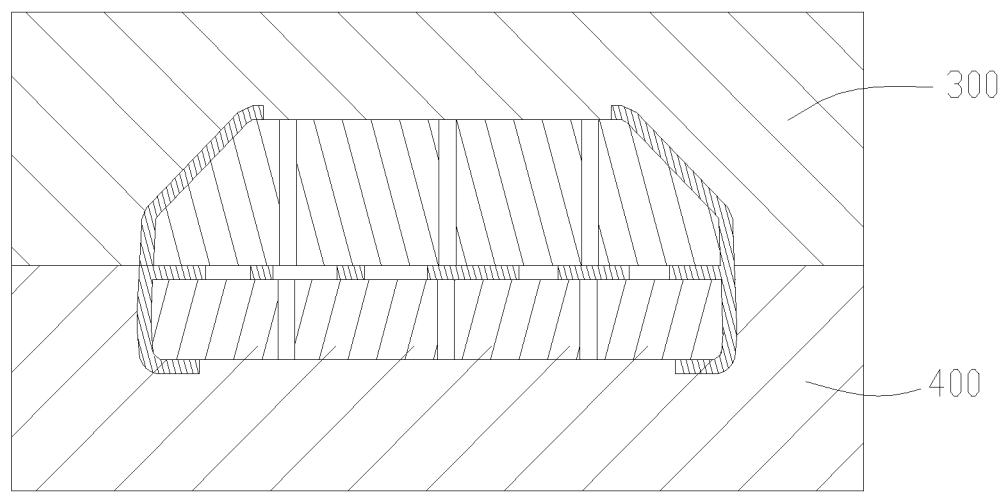
FIG. 19 is a schematic view showing that the first mold plate and the second mold plate are arranged together.
Figure 20:
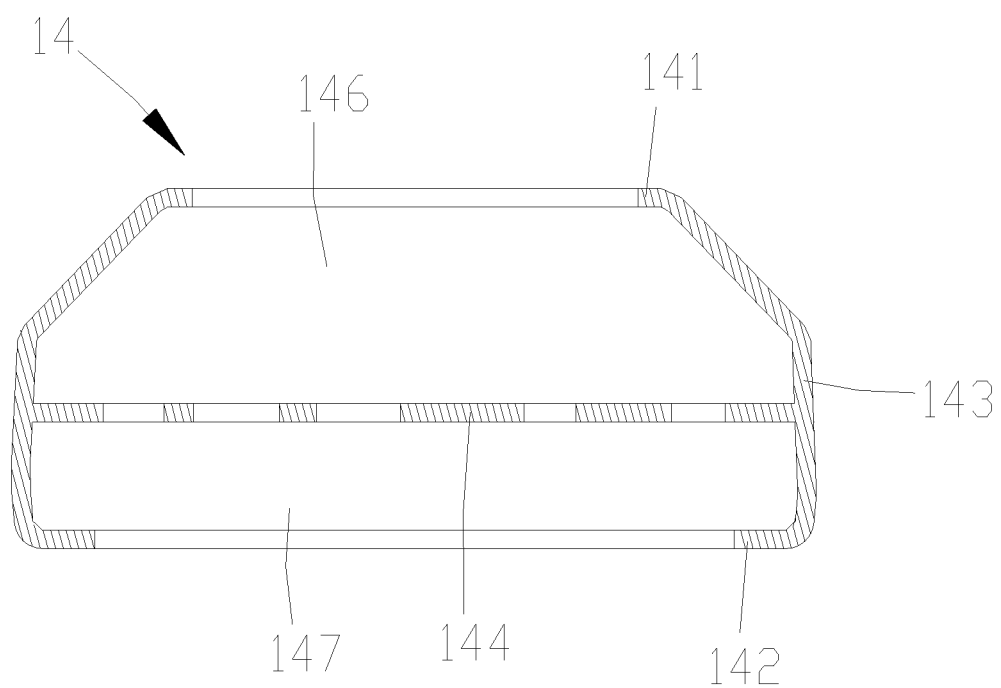
FIG. 20 is a schematic view corresponding to the following step in FIG. 15: separating the first mold plate from the second mold plate, taking the filler out through the first mounting opening in the upper plate and the second mounting opening in the lower plate, thereby obtaining the fuselage.

Step S20, forming the upper plate 141 of the fuselage 14 and the upper portion 1431 of the connecting plate 143 through the first mold plate cavity 302 of the first mold plate 300, and forming the lower plate 142 of the fuselage 14 and the lower portion 1432 of the connecting plate 143 through the second mold plate cavity 402 of the second mold plate 400 (as shown in FIG. 17).

Step S30, filling the first mold plate cavity 302 in which the upper plate 141 and the upper portion of the connecting plate 143 are formed with filler 500 till a height of the filler 500 reaches that of each first cylinder body 303, and filling the second mold plate cavity 402 in which the lower plate 142 and the lower portion of the connecting plate 143 are formed with filler 600 till a height of the filler 600 reaches that of each second cylinder body 403 (as shown in FIG. 17).

Step S40, providing the middle spacing plate 144, arranging the middle spacing plate 144 in the second mold plate cavity 402, coating glue on the connecting positions between the middle spacing plate, the lower portion 1432, and the upper portion 1431. In the embodiment, an edge of the middle spacing plate 144 is arranged on the circumferential surface of the lower portion 1432 of the connecting plate 143; while in other embodiments, the middle spacing plate 144 can be arranged in the first mold plate cavity 402 or arranged between the lower portion 1432 and the upper portion 1431 of the connecting plate 143.

Step S50, closing the first mold plate 300 and the second mold plate 400 for a preset time duration such that the upper portion 1431, the lower portion 1432, and the middle spacing plate 144 can be integrated into one piece.

Step S60, separating the first mold plate 300 from the second mold plate 400, and taking the filler 50 out through the first mounting opening 1411 in the upper plate 141 and the second mounting opening 1421 in the lower plate 142, thereby obtaining the fuselage 14.

The upper plate 141 and the upper portion 143 of the connecting plate 143 can be formed by laying carbon fiber layer; the lower plate 142 and the lower portion of the connecting plate 143 can also be formed by laying carbon fiber layer; and the middle spacing plate 144 is pre-formed by carbon fiber.

The first cylinder bodies 303 and the second cylinder bodies 403 are preferably metal cylinders to provide sufficient supporting force; and the filler 50 is flexible material such as silicone which can be taken out conveniently.

The preset time duration in which the first mold plate 300 and the second mold plate 400 are closed together preferably lasts for 5 to 10 hours, allowing the upper portion 1431, the lower portion 1432, and the middle spacing plate to be integrated into one piece and guaranteeing manufacturing efficiency.

The present invention is not limited to the above embodiments, and various modifications can be performed based on the technical solutions disclosed in the above embodiments.

What is claimed is:

1. A fuselage of an unmanned aerial vehicle, wherein the fuselage comprises an upper plate, a lower plate opposite to the upper plate, a connecting plate, and a middle spacing plate; the connecting plate is connected between the upper plate and the lower plate; the upper plate, the lower plate, and the connecting plate are enclosed to define a receiving space; the middle spacing plate is arranged in the receiving space and divides the receiving space into an upper cavity and a lower cavity; the upper plate, the lower plate, the connecting plate, and the middle spacing plate are integrally formed; the upper cavity is located between the middle spacing plate and the upper plate, and the lower cavity is located between the middle spacing plate and the lower plate; and a first mounting opening is defined in the upper plate allowing a component to enter the upper cavity, and a second mounting opening is defined in the lower plate allowing a component to enter the lower cavity.

2. The fuselage of claim 1, wherein the upper plate, the lower plate, the connecting plate, and the middle spacing plate are integrally formed by conductive material.

3. An unmanned aerial vehicle, wherein the unmanned aerial vehicle comprises a housing and a remote sensing equipment arranged in the housing; the housing comprises an upper cover, a lower cover, and a fuselage;

the housing comprises an upper cover, a lower cover, and a fuselage;
the fuselage comprises an upper plate, a lower plate opposite to the upper plate, a connecting plate, and a middle spacing plate; the connecting plate is connected between the upper plate and the lower plate; the upper plate, the lower plate, and the connecting plate are enclosed to define a receiving space; the middle spacing plate is arranged in the receiving space and divides the receiving space into an upper cavity and a lower cavity; the upper plate, the lower plate, the connecting plate, and the middle spacing plate are integrally formed; the upper cavity is located between the middle spacing plate and the upper plate, and the lower cavity is located between the middle spacing plate and the lower plate; and a first mounting opening is defined in the upper plate allowing a component to enter the upper cavity, and a second mounting opening is defined in the lower plate allowing a component to enter the lower cavity;
the upper cover is detachably mounted on the upper plate of the fuselage to cover the first mounting opening; and
the lower cover is detachably mounted on the lower plate of the fuselage to cover the second mounting opening.

4. The unmanned aerial vehicle of claim 3, wherein the lower plate of the fuselage is provided with a first restricting portion and a third restricting portion, the lower cover is provided with a second restricting portion and a fourth restricting portion; motions in six directions between the lower cover and the lower plate are restricted by abutting the first restricting portion against the second restricting portion and by clamping the third restricting portion onto the fourth restricting portion.

5. The unmanned aerial vehicle of claim 4, wherein the lower cover comprises a bottom plate and a side wall extending towards the lower plate from an edge of the bottom plate, and the bottom plate and the side wall are enclosed to form a receiving cavity.

6. The unmanned aerial vehicle of claim 5 further comprising a battery mounted in the receiving cavity.

7. The unmanned aerial vehicle of claim 5, wherein the bottom plate is cross shaped; the side wall comprises a couple of opposite first side plates, a couple of opposite second side plates, and a number of combination plates each of which is connected between each first side plate and the adjacent second side plate; the second restricting portion is located on an end portion of each combination plate facing the lower plate; the first restricting portion comprises a number of protruding edges protruding from a position of the lower plate corresponding to the combination plate towards the second mounting opening; the end portion of the combination plate facing the lower plate abuts outer sides of the protruding edges; the fourth restricting portion comprises a number of blocks extending away from the receiving cavity from one ends of the first side plate and the second side plate which are adjacent to the lower plate; the third restricting portion is located on the lower plate and is adjacent to an edge of the second mounting opening; the blocks are inserted into the lower cavity by pressing the first side plate and/or the second side plate; and the blocks abut an inner side of the lower plate adjacent to the edge of the second mounting hole after the first side plate and/or the second side plate are restored to original positions.

8. The unmanned aerial vehicle of claim 3, wherein the remote sensing equipment comprises a photographing device which is detachably mounted on the middle spacing plate by extending into the lower cavity through the second mounting opening; the photographing device comprises a lens set; and the lower cover defines an opening allowing the lens set to extend out of the lower cover.

9. The unmanned aerial vehicle of claim 8, wherein the photographing device comprises a mounting bracket, a rotating bracket, a first PCB board with an image obtaining chip fixed thereon, a second PCB board with a main control chip and a storage module fixed thereon, and a driving device; the photographing device is mounted on the middle spacing plate via the mounting bracket; the rotating bracket is rotatably mounted on the mounting bracket via a rotating shaft; the driving device is connected to the rotating shaft to drive the rotating shaft to rotate, thereby driving the rotating bracket to rotate relative to the mounting bracket; the first PCB board and the second PCB board are mounted on the rotating bracket, and the lens set is mounted on the first PCB board; and the opening is elongated such that the lens set can rotate along the opening to realize photographing in different directions.

10. The unmanned aerial vehicle of claim 9, wherein the photographing device further includes a protection housing; the rotating bracket, the driving device, the first PCB board, and the second PCB board are arranged in the protection housing; the protection housing defines a lens mounting hole allowing the lens set to extend out of the protection housing and a number of vents; the rotating shaft is arranged in the protection housing, and two ends of the rotating shaft extend out of the protection housing and are rotatably mounted on the mounting bracket.

11. The unmanned aerial vehicle of claim 10, wherein the protection housing is a hollow cylinder which comprises a circumferential surface and two opposite bottom surfaces; the lens mounting hole is defined in the circumferential surface, and two ends of the rotating shaft extends out of the protection housing through the bottom surfaces; the first PCB board and the second PCB board are perpendicularly arranged on the rotating bracket; the mounting bracket comprises a first fixing plate, a second fixing plate spaced from the first fixing plate, a number of buffering members connected between the first fixing plate and the second fixing plate, and two supporting arms; and the supporting arms are secured on one side of the second fixing plate away from the first fixing plate for mounting the rotating bracket; and the first fixing plate and the middle spacing plate are fixed together.

12. The unmanned aerial vehicle of claim 3 further comprising a main control panel, a radio station panel, a GPS module, a 2.4G image transmission panel, and a shielding plate; the shielding plate is arranged in the upper cavity and is spaced from the middle spacing plate; the main control panel, the radio station panel, the 2.4G image transmission panel are arranged in the upper cavity and are located between the middle spacing plate and the shielding plate; and the GPS module is arranged in the upper cavity and is located between the shielding plate and the upper cover such that the shielding plate can shield impacts on the GPS module from the main control panel, the radio station panel, and the 2.4G image transmission panel.

13. The unmanned aerial vehicle of claim 12, wherein the shielding plate comprises a middle conductive layer and two insulting layers respectively covering on an upper surface and a lower surface of the middle conductive layer.

14. The unmanned aerial vehicle of claim 3, wherein the upper plate, the lower plate, the connecting plate, and the middle spacing plate are integrally formed by conductive material.

15. The unmanned aerial vehicle of claim 14, wherein the upper plate, the lower plate, the connecting plate, and the middle spacing plate are integrally formed by carbon fiber, the upper cover and the lower cover are made of glass fiber, and the middle spacing plate defines at least one through hole.

16. The unmanned aerial vehicle of claim 12 further comprising a video transmission antenna connected to the 2.4G image transmission panel and a radio station antenna connected to the radio station panel; and the video transmission antenna and the radio station antenna extend out of the fuselage through the lower plate to be located at two opposite sides of the lower cover.

* * * * *